9429X
H. CLARK.
Cotton Gin.
Patented Feb. 25, 1836.
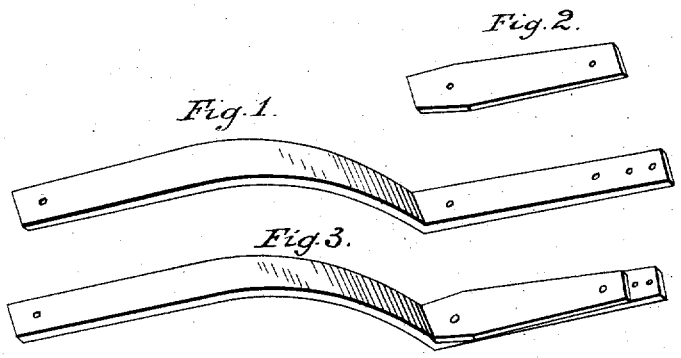
N. PETERS, Photo-Lithographer, Washington, D.C.

9429X [illegible] Feb 25, 1836 313.

Henry Clark New London Ct

Letters Patent

The schedule referred to in these Letters Patent and making part of the same containing a description in the words of the said Henry Clark himself of his improvement in the rib for saw cotton Gins To all to whom these presents shall come: Be it known that I Henry Clark of New London in the County of New London and State of Connecticut have invented a new and useful improvement in the Rib for the saw cotton Gin - and the following is a full and exact description of said improvement. First. the Rib is made in two parts viz. by an Iron foundation and a face of steel or hardened iron. the latter fastened firmly to the former with rivets screws or catches. Fig 1. is the foundation. Fig. 2. the face. Fig 3. the Rib finished. the length width thickness and shape of the Rib will vary according to the size of the Gin and the fancy of the maker as may the face vary in all these respects without affecting my improvement. The superiority of my improved Rib over all others in use is obvious in the following particulars - first the Rib is more perfect. 2nd When the face of the Rib becomes so worn as to need repairs it is easily taken off the foundation and a new one put in its place for one fourth the ordinary expense of repairing. & 3d The improved Rib can be afforded at a less price than any other. The manner of making the improved Rib is as follows. Take iron rolled or hammered one half inch wide, by three sixteenths thick and sixteen inches long, punch five holes. three of them in the usual places for fastening the Rib to the frame, the other two for fastening the face on. bend this to the shape desired this is the foundation. then take the steel or iron rolled one eighth of an inch thick. cut it with a lever shears the shape required punch two holes to correspond with the holes in the foundation. fasten them together by screws rivets or catches in such a man 314. 9429X ner that the face can be easily taken off the foundation. and a new one put in its stead. harden and polish the face and the Bit is done. What I claim as my own invention and not previously known in the above described Bit is the making it in two parts viz an iron foundation and a steel or hardened iron face fastened together either with screws rivets or catches so that when the face becomes worn by use or other causes or injured it can easily be detached from the foundation and a new face put in its place. and this is all I claim heretofore the Bit has been made with an iron foundation and a face of steel welded together. the superiority of my improvement is this. that whenever the face of the Bit by use or other cause becomes worn or injured so as to require repairs or a new face the old face can readily be detached from the foundation and another face put in its stead whereas according to the former method of securing the face to the foundation by welding great difficulty and expense was necessarily incurred in order to remove an old face and replace that or a new one Witnesses
J C Scammed
Wm P Cleaveland Jr Henry Clark 564 [illegible]

Ex.
Ch'd [illegible]

Drawing